July 9, 1963
J. T. DICKINSON
3,096,597
FISHING LURE HAVING DETACHABLE HOOK SUPPORTING MEANS
Filed April 17, 1961
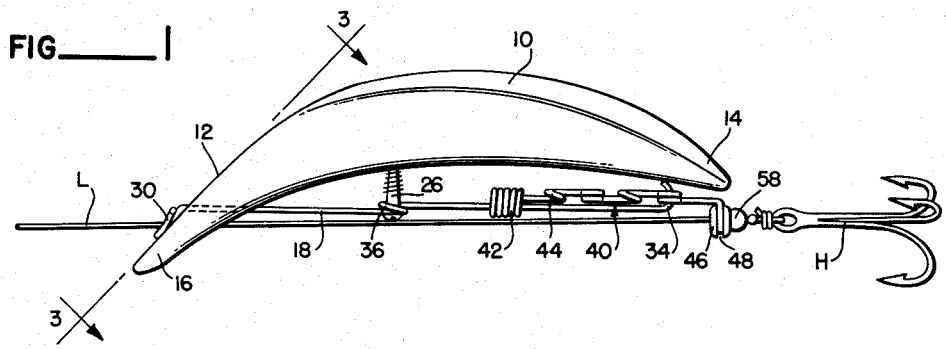
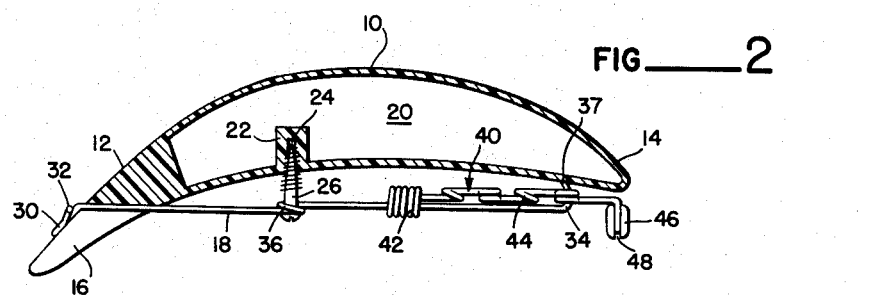
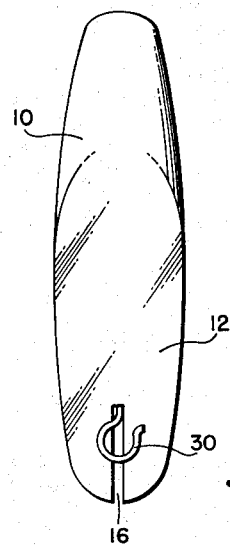
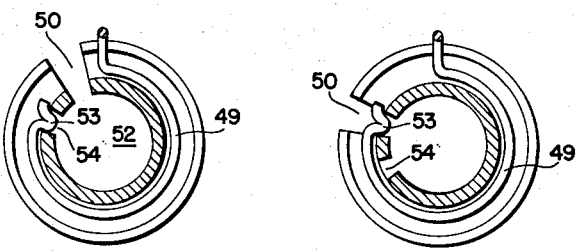
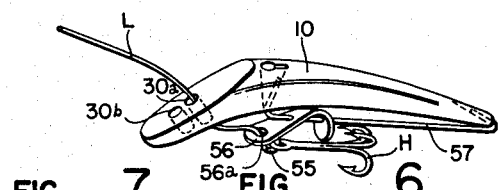
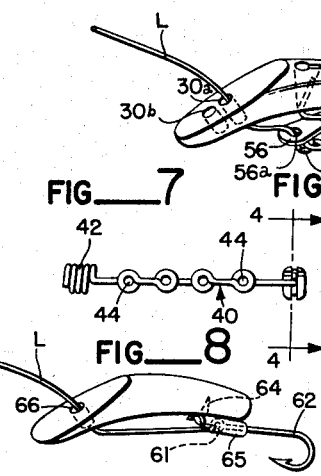
JOHN T. DICKINSON
INVENTOR.
BY Clarence M. Tuck

# United States Patent Office 3,096,597
Patented July 9, 1963

3,096,597
FISHING LURE HAVING DETACHABLE HOOK
SUPPORTING MEANS
John T. Dickinson, 104 Wall St., Seattle, Wash.
Filed Apr. 17, 1961, Ser. No. 103,645
2 Claims. (Cl. 43—42.05)

This present invention relates to the art of artificial fishing lures and more particularly to a combined fishing lure and a hook supporting line or leader which are very simply and quickly attachable to or detachable from each other.

Fishing with moderate sized plugs and lures has been given a great impetus by the more general use of spinning rods of various weights and particularly the use of spinning type reels with their ability to pay off line from the end of the spool practically without friction or inertia. As a result of this increased use of equipment which makes it possible to cast very light lures to a considerable distance, the lightweight spinning gear is, to a large degree, displacing the fly and bait rods and attendant equipment. However, in order to apply this equipment to the broader fishing fields it is necessary to provide a facility for conveniently changing lures as has been formerly done only by fly fishermen who many times would change their flies at a single fishing pool several times in order to give the fish a lure or fly which closely approached the appearance of their preferred food at that time. In this present equipment I have provided a most convenient means of changing the lures with respect to the fishing line and hooks attached thereto so that it is convenient now for a fisherman to carry a number of lures of different conformation, color and size so that he may present a lure to the fish that meets the conditions of the day.

Formerly in using spinning type lures or the smaller sizes on fly rods the attached hooks presented such a problem that it was necessary that each lure be separately boxed or enclosed. With this present arrangement however the fisherman may carry a number of lures loose in his pocket if he wishes without any danger or inconvenience and select those that he wishes to try. This arrangement further permits a greater selection of lures for the same investment since the labor involved in applying hooks and the like to the usual lure formed a very considerable part of the cost of the same.

A principal object of this present invention therefore is to provide a fishing lure having a new and novel means of retaining and supporting a fish line which may be readily attached or detached.

A further object is to provide means for allowing attraction, stabilizing or balancing beads on the line to be carried in reserve so that they may be used fore and aft of the lure for either attraction, stabilizing or balancing purposes in order to produce varied actions of the lure.

A further object is to provide means for allowing a line to move freely within a hollow means for retaining and supporting the line so that hooks may be pulled away from the lure when a fish is hooked but with the line still passing through the lure.

A further object is to provide adjustable means to suspend and support the hooks attached to the line at various extended positions in the rear of the lure.

A further object of this invention is to provide means for attaching the line supporting means with a single inexpensive operation.

A further object is to provide means for adjusting the tension on the line gripping means in order to retain and support the line at the head of the lure.

Further objects, advantages and capabilities will be apparent from the description and disclosure in the drawings or may be comprehended or are inherent in the device.

In the drawings:

FIGURE 1 is a side elevation of a lure made after the teachings of this present invention and showing it in its normal position of use.

FIGURE 2 is a vertical, cross sectional view taken longitudinally through the body of the lure shown in FIGURE 1.

FIGURE 3 is a general top view of my lure taken as viewed from the plane 3—3 of FIGURE 1.

FIGURE 4 is a cross sectional view taken along the line 4—4 of FIGURE 7, illustrating the line guide and hook stop abutment in its open position so that a line can be easily removed or installed therein.

FIGURE 5 is a view similar to FIGURE 4 but showing the means employed to secure the entry opening against the return passage of the line thereto.

FIGURE 6 is an illustration, in side elevation, of a slightly modified form of lure of the type that would be most suitable, because of its small size, for use on a fly rod.

FIGURE 7 is a top plan view of the adjustable guide means, this means being shown in elevation in FIGURES 1 and 2.

FIGURE 8 is a canted side view of a reduced scale plug similar to the plug of FIGURE 6 and showing a simplified tubular hook holder.

Referring to the drawings, throughout which like reference characters indicate like parts the numeral 10 designates the body of a lure adaptable for use with my present equipment. The body has an arcuate longitudinal form as viewed from the side. Throughout the various figures of the drawings, the same form of lure has been shown and this is to be considered an examplary showing only as this form of line releasing and engaging means has a wide range of adaptability to various other forms of fishing lures. In the form shown there is a planar frontal water impinging surface 12, substantially tangent to the arcuate top surface of the lure, that is commonly employed in plug lures to create a means for using the impingement of the water to cause a swimming or other desirable action of the lure. Normally it is best when a transverse section through this water impinging surface is flat. The rear of trailing end of the lure 14 is normally brought to a tail-like end which is streamlined to present proper streamlined flow of water. Referring to FIGURE 2 it is to be noted that the water impinging surface 12 is provided with an open slot 16. This slot is normally just wide enough to accept the line gripping metal rod 18. In FIGURE 2 the lure body is shown as having a cavity at 20 and this is in keeping with the modern thought of making lures of this order of plastic material. They must then be hollow to give the degree of buoyancy desired. It follows that if the more conventional wooden form of body, to which my line releasing means is adaptable, is employed flotation is determined by the weighting of the lure body. In the form shown in FIGURE 2 an interior boss 22 is provided having a guide opening 24 so that a line gripping clamp screw 26 may be adjustably positioned therein.

The line gripping clamp rod is provided at its front end with a line gripping loop means 30 which normally, except for its extreme end 32, lies in snug engagement with the water impinging surface 12. As can be seen with particular clarity in FIGS. 1 and 3, the closed portion of loop 30 extends across slot 16, to obstruct the slot and prevent line L from escaping downwardly. The extreme end 32 is raised from this surface sufficiently so that the line or leader can be engaged under the end and in that way easily threaded into the secured position. Rod 18 passes through slot 16 and rearwardly generally in the direction of the rear or trailing end 14 of the lure. At its extreme end rod 18 has an up-turned or hook end 34 which is disposed so that it will engage the under side of the lure at 37. This arrangement is desirable in order to provide a secure anchorage for the adjustable guide means. Intermediate its ends rod 18 is preferably bent in a rather tight loop 36 to engage the line gripping clamp screw 26. With the clamp screw engaged within the guide hole 24 of boss 22 it provides a means for bowing the gripping rod 18 to increase the tension on loop 30 at the point where it engages the water impinging surface 12. Additionally of course screw 26 forms the single attaching means for securing my invention to a typical lure.

The adjustable guide means 40 has at its forward end a tight coil 42 adapted to loosely engage the line gripping rod 18 as will be observed in FIGURES 1 and 2. Progressing rearwardly the adjustable guide means is provided with a plurality of loop openings as 44 which are adapted to engage the up-turned hooked end 34 of rod 18. Any reasonable number of these openings may be provided which provide adjusting steps for the positioning of the line guide and hook stop abutment means 46 at the end of the adjustable guide means 40. The hook stop or abutment 46 is provided with a through opening 52 having a radial opening 50 into it. This is shown on enlarged scale in the sectional views of FIGURES 4 and 5. The actual stop means or abutment 46 is formed as a bead with a groove portion 48 which accommodates the end 49 of the guide means 40. FIGURE 4 shows the bead as revolved slightly so as to show a clear opening 50 in which the line or leader can be easily engaged and pass into the center opening 52 of the bead or stop abutment. It has been found most desirable to have this opening 50 definitely positioned and for this purpose the extreme end of member 49 is bent inwardly to form a detent at 53. Within the bead 46 a detent receiving depression or opening 54 is provided. Referring to FIGURE 5, it will be noted that the bead has been revolved sufficiently to remove detent 53 from the opening 54 and to seat it in the slot or opening 50 to form a complete and definite closure therefor. Tempered non-corrosive wire is a preferred material for the making of the adjustable guide means. The device provides a resilient or biasing means for locking the abutment in its closed position.

In the small scale modified form of my lure shown in FIGURE 6, the hook stop or abutment 56 has a forward line opening 56a small enough to stop a bead 58 or preferably a split ring 55. The abutment 56 is bent and pierced twice to form a position locking means on wire 57 so that it may be variously positioned fore and aft on the wire 57 in order to change the towing balance of the lure and also the position of hook H. Two line openings 30a and 30b are provided in the nose of the lure. The guide wire 57 is removably positioned in slots cut in body 10. Wire 57 is positioned close to the under side of body 10 to cause stop 56 to engage the body and be positioned rotatively thereby. The rear end of stop member 56 is bent downwardly to engage the shank of hook H and prevent it being entangled on wire 57.

FIGURE 8 is a lure further reduced in size from the plug of FIGURE 6 and simplified by having only one line opening 66 and a hook holder 65 formed as a distorted tube which is flattened to engage the eye 61 of the hook 62 and prevent the hook from turning. A tack 64 at the front end of the tube prevents the hook from being pulled through the tube.

In attaching my line and hook supporting means to a suitably adapted lure body, as 10, shown in FIGURES 1 and 5, either the leading or trailing end may be attached first. Assuming that the leading end is first attached, the line L is engaged under the bent-up loop end 32 and in a circular movement brought around so that the line is within the circle of loop 30 and in this form may be passed through slot 16 either before or after this operation.

It is desirable that an adjusted amount of tension be provided between the loop 30 and the water impingement surface 12 so that the line is secured to a degree at this point. This is particularly desirable if heavy hooks H are employed which in casting might tend to go faster than the body of the lure due to its added resistance. It is desirable however that only a small amount of friction be applied so that when a fish strikes it is possible for the line to thus leave the clamp means provided by loop 30 and the impingement surface 12. Thus the lure is permitted to slide up the line away from the fish. This protects the lure body itself and also prevents the fish from using the lure body as a means to help dislodge the hook. Before engaging the line L in the rear line guide 40 which terminates in bead 46 and which provides a stop or abutment, bead 46 must be revolved so that the opening 50 is positioned as shown in FIGURE 4. Then the line is passed sideways through opening 50 into the center opening 53. The bead is then turned so that opening 50 is closed after the showing of FIGURE 5. It has been found desirable to employ a bead as a hook stop 58 because it will form an adequate stop but will not become engaged with the abutment as might occur with the eye of the hook and the knotting of the line or leader on the hook. It is believed it will be apparent that the removal of the lure body and its associated hook supporting and adjusting means is achieved in the reverse order of its attachment. Experience has shown that this is an operation that can be very quickly done. In fact it is a much quicker operation than for a fly fisherman to detach one fly from his leader and secure the other one thereto.

It is believed that it will be apparent from the above description and the disclosure in the drawings that the invention comprehends a novel construction of a fishing lure having detachable hook supporting means.

Having thus disclosed the invention, I claim:

1. A fishing lure comprising a floatable body having an arcuate longitudinal form and a frontal water impingement surface at its forward end, said forward end of said floatable body defining a longitudinally extending slot which is open at said forward end for the passage of a fishing line through said slot, a metal rod secured to said line, said rod terminating in an open loop adjacent said water impingement surface, the closed portion of said loop crossing said slot to obstruct the same, said rod having a horizontal loop intermediate its rear end and a screw passing through said loop and secured to the under side of said lure, a rearward extension of said rod terminating in an upturned hook, an adjustable guide means having a tight coil at its front end and encircling said rearward extension of said rod and having a plurality of horizontal loop openings individually adapted to engage said upturned hook, said guide means terminating in a line guide and hook abutment.

2. A fishing lure as recited in claim 1 in which said hook abutment means comprises a circumferentially grooved revolvable bead and a vertical loop at the terminal end of said adjustable line guiding means of a size to resiliently engage said groove of said bead, said bead being provided with a radial opening wide enough to pass a fishing line therethrough and said loop being provided with means to obstruct said opening in said bead when the fishing line is engaged therein.

References Cited in the file of this patent

UNITED STATES PATENTS

| | | |
|---|---|---|
| 2,236,353 | Minser | Mar. 25, 1941 |
| 2,290,702 | Nelson | July 21, 1942 |
| 2,325,107 | Burns | July 27, 1943 |
| 2,582,627 | Gaylord | Jan. 15, 1952 |
| 2,734,301 | Fuqua | Feb. 14, 1956 |
| 2,778,143 | Bratz | Jan. 22, 1957 |